United States Patent [19]

Brookner

[11] Patent Number: 4,914,441

[45] Date of Patent: Apr. 3, 1990

[54] METHOD OF PROCESSING IN A PULSE DOPPLER RADAR

[75] Inventor: Eli Brookner, Lexington, Mass.

[73] Assignee: Raytheon Company, Lexington, Mass.

[21] Appl. No.: 237,351

[22] Filed: Aug. 29, 1988

[51] Int. Cl.[4] ............................................. G01S 13/52
[52] U.S. Cl. .................................... 342/161; 342/196
[58] Field of Search ............... 342/161, 154, 160, 162, 342/163, 149, 195

[56] References Cited

PUBLICATIONS

"A Displaced Phase Center Antenna Concept for Space Based Radar Applications", E. J. Kelly and G. N. Tsandoulas, IEEE Eascon '83–16th Annual Electronics and Aerospace Conference and Exposition, Sep., 1983.

Primary Examiner—Thomas H. Tarcza
Assistant Examiner—G. Barron, Jr.
Attorney, Agent, or Firm—Philip J. McFarland; Richard M. Sharkansky

[57] ABSTRACT

A method of operating a pulse Doppler radar to increase the probability of detection of an airborne target is shown to consist of transmitting interrogating pulses with a high pulse repetition frequency and processing received signals using any conventional pulse Doppler technique for echo signals having a Doppler shift frequency outside the spectrum of Doppler shift frequencies of clutter and using a DPCA technique at a submultiple of the pulse repetition frequency for echo signals having a Doppler shift frequency within the spectrum of Doppler shift frequencies of clutter.

6 Claims, 4 Drawing Sheets

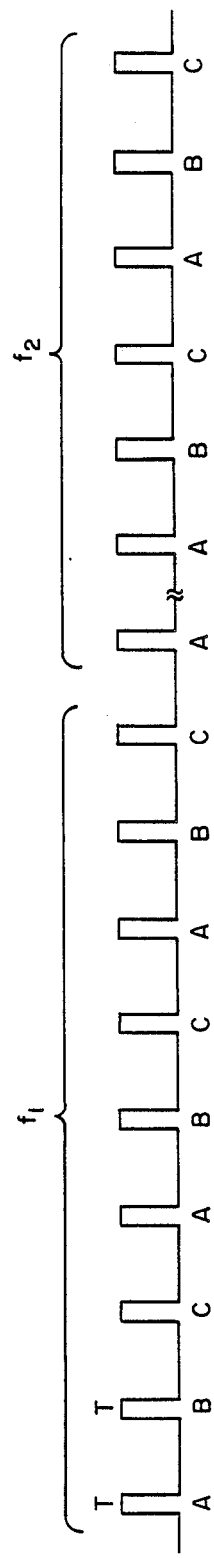
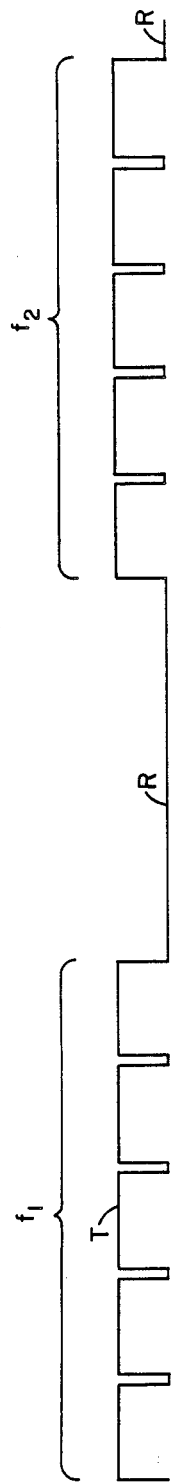
FIG. 2A
FIG. 2B

METHOD OF PROCESSING IN A PULSE DOPPLER RADAR

This invention was made with Government support under Contract No. N00039-81-C-0047 awarded by the Department of the Navy. The Government has certain rights in this invention.

BACKGROUND OF THE INVENTION

This invention pertains generally to tracking radars, and particularly to tracking radars using pulse Doppler techniques.

It is well known in the art that a so-called pulse Doppler radar may be used to advantage to determine, along with range and direction, the Doppler velocity of an airborne target (hereinafter referred to simply as a target) relative to such a radar. It is equally well known that, unless care is taken, any pulse Doppler radar may suffer from the effects of ambiguities in measurement of either, or both, range and Doppler velocity.

Although it is known to change the pulse repetition frequency (PRF) of any pulse radar, including a pulse Doppler radar, to eliminate any ambiguity in the measurement of Doppler velocity (and concomitant "blind speeds") and it is known to change the PRF of any pulse radar, again including a pulse Doppler radar, to eliminate any ambiguity in the measurement of range (and concomitant "blind ranges"), there has heretofore been no way, without suffering a large detection loss and complex processing to detect multiple targets simultaneously havinq low and high Doppler velocities and to resolve the Doppler ambiguity problem, in which both parameters could be simultaneously adjusted to optimize operation of a pulse Doppler in an earth satellite (referred to hereinafter as a satellite) moving in orbit.

When a pulse Doppler radar is used in a satellite in orbit some hundreds of miles above the surface of the earth to search for a relatively small target, provision must be made to reduce the effect of clutter received either in the main lobe or a side lobe of the pulse Doppler radar. At the same time, care must be taken to avoid loss of echo signals from any desired target even when the Doppler shift frequency of the echo signals from the target approachs or coincides with the Doppler shift frequency of any clutter signals. In addition, it is highly desirable that the minimum Doppler velocity that may be measured be kept as low as possible so that detection of any target is independent of the actual course of a target relative to the satellite. In addition to the foregoing, it is a further problem to reduce the size and power requirements of any equipment in a satellite to a minimum.

It has been suggested that bursts of interrogating pulses at different "medium" pulse repetition frequencies (meaning pulse repetition frequencies at which both Doppler blind speeds and range eclipsing of targets of interest are normally experienced) may be used to produce echo (meaning from a target) and clutter signals that may be processed to achieve a satisfactory probability of detection of targets. The contemplated processing includes a type of processing referred to herein as the Displaced Phase Center Antenna (DPCA) technique. In the past such a technique basically has involved: (a) making the antenna appear to received signals to be stationary even though the antenna may be mounted on a satellite moving in orbit; (b) using any known cancellation arrangement selectively to attenuate clutter signals while significantly decreasing the echo signal amplitude for many targets when such reduction cannot be afforded; and (c) utilizing the complex processing techniques to extract a true range measurement from two or more individually ambiguous measurements.

Finally, it has been recognized that other shortcomings of known pulse Doppler radars for use in satellites exist. For example, losses resulting from gating out main lobe clutter transients in the received signals, i.e., "window" losses, can be significant in known pulse Doppler radars for satellites.

SUMMARY OF THE INVENTION

With the foregoing in mind, it is an object of this invention to provide a method of operating a pulse Doppler radar in a satellite in orbit to increase the probability of detection of targets of interest.

Another object of this invention is to reduce the effect of any signal attenuation suffered in clutter cancellation.

Another object of this invention is to render detectable a target with a Doppler velocity lower than any known minimum.

Another object of this invention is to reduce the size and weight of the required power supply.

Still another object of this invention is to reduce processing losses to a minimum.

The foregoing and other objects of this invention are attained generally by providing, for a known pulse Doppler radar on a satellite in orbit, a method of operation made up of the steps of: (a) transmitting bursts of coded interrogating pulses from a beam forming antenna for a relatively long period of time to reduce window loss, the PRF of such pulses being "high" to eliminate Doppler blind speeds in a range of interest, the duty cycle of such pulses being relatively low to reduce range eclipsing to an acceptable level, and the duration of each burst preferably being larger than the sum of the propagation time of interrogating pulses from the pulse Doppler radar to a target and the propagation time of the resulting echo signals returned to such radar; (b) controlling the transmit/receive switching module in the pulse Doppler radar preferably with class C amplifiers to reduce the size and weight of the required power supply; (c) determining a first portion of the echo signals characterized by a Doppler shift frequency in the order of the Doppler shift frequency of clutter in the main lobe of the beam forming antenna, such clutter and echo signals being processed after forming a displaced phase center for such antenna to counteract the effect of motion of the satellite so that the ratio of the amplitude of echo signals to clutter is substantially increased, such processing including the steps of (i) repetitively dividing the remaining portion into N subsets of received signals, where N is an integer greater than unity, each of such sets comprising the received signals derived from every $N^{th}$ pulse in each burst so that the effective PRF in each subset corresponds with the actual PRF of the coded interrogating pulses in each burst thereof divided by N; and (ii) repetitively passing each subset of received signals through an M pulse canceller, where M is an integer greater than unity, selectively to attenuate any clutter from the main lobe and side lobes of the beam from the beam forming antenna; (d) separately processing the remaining portion of the echo signals, i.e., those signals characterized by having Doppler shift frequencies differing substantially from the Doppler shift frequencies of main lobe clutter, such processing corresponding to any known way of processing received signals in a pulse Doppler radar; and (e) selecting any return signal corresponding to a target from the signals derived in steps (c) and (d).

BRIEF DESCRIPTION OF THE DRAWINGS

For a more complete understanding of this invention reference is now made to the following description of the accompanying drawings in which:

FIG. 2A is a sketch illustrating a first high PRF pulse train usable in the contemplated method;

FIG. 2B is a sketch illustrating a second high PRF pulse train also usable in the contemplated method;

DESCRIPTION OF THE PREFERRED EMBODIMENT

Figure 1:
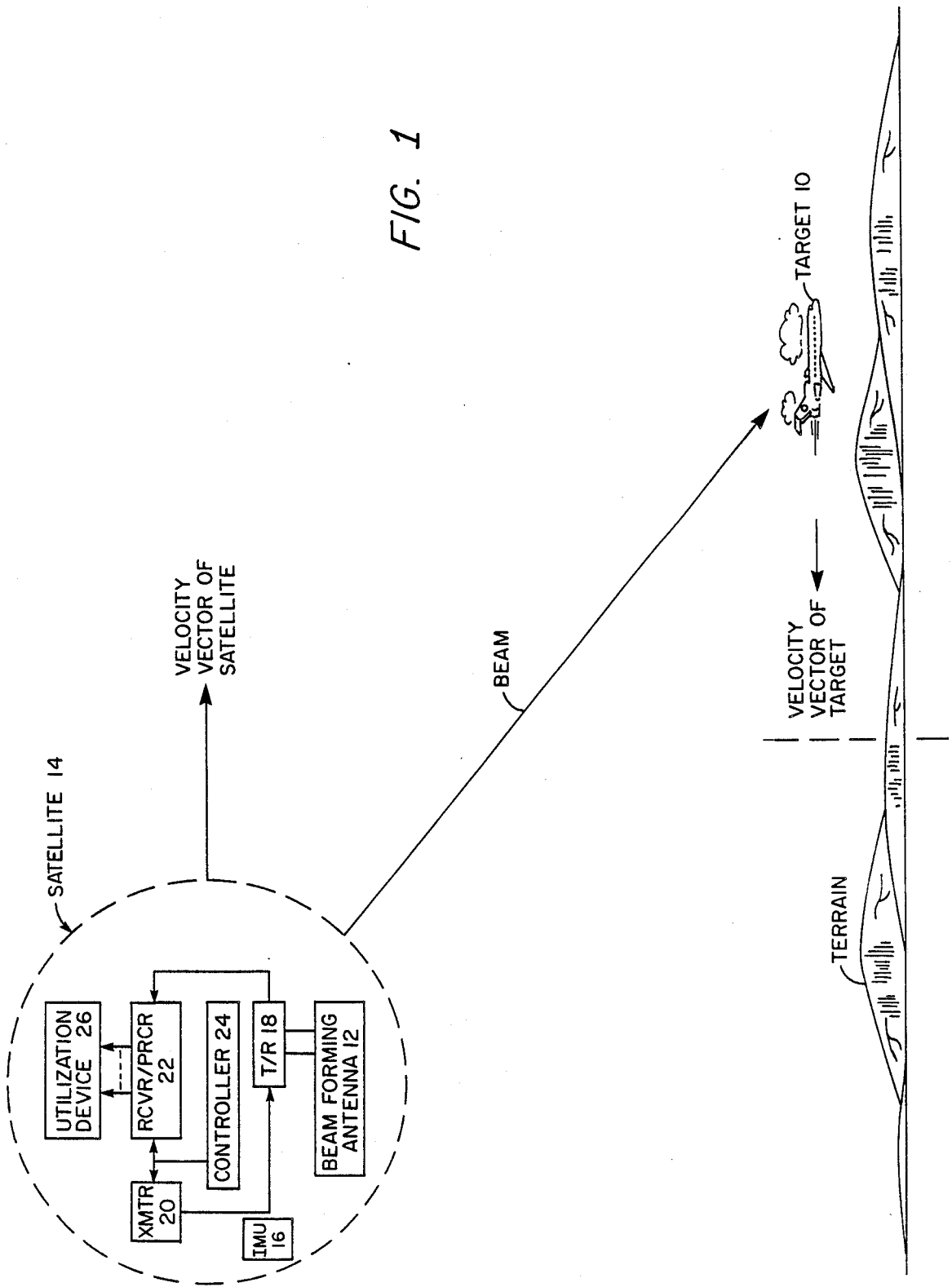
FIG. 1 is a sketch, greatly distorted in order to illustrate the major elements of a system for implementing the invention, showing a tactical situation in which the method here contemplated could be used.

Referring now to FIG. 1, it may be seen that a target 10 is moving along a course indicated by the legend VELOCITY VECTOR OF TARGET above a terrain (not numbered). The target 10 is illuminated by electromagnetic energy in a beam (not numbered) from a beam forming antenna 12 in a satellite 14. The orbit of the satellite 14 is indicated by the legend VELOCITY VECTOR OF SATELLITE. An inertial measurement unit 16 of conventional construction here is carried on the satellite 14 for the purposes of stabilizing the beam forming antenna 12 and, inter alia, of determining the velocity vector of the satellite 14 and of aligning the longitudinal axis of the beam forming antenna 12 with the relative velocity vector of the satellite 14 with respect to the earth (such relative velocity including the velocity vector of the earth).

The beam forming antenna 12 here is preferably a phased array antenna making up the radiating and receiving element of a pulse Doppler radar (not numbered). The elements of such radar are conventional, consisting of a transmit/receive module (T/R 18), a transmitter (XMTR 20), a receiver/processor (RCVR/PRCR 22) and a controller 24 to produce target indicating signals for a utilization device 26.

The controller 24 here is operative either to have the pulse train shown in FIG. 2A or the pulse train shown in FIG. 2B transmitted, received and processed. The utilization device 26 may, for example, be a telemetry unit of conventional construction operating in concert with a ground station (not shown).

Referring now to FIG. 2A, it may be seen that a preferred pulse train consists of a first burst of pulses at a first frequency having a duration far longer than the round trip propagation time of electromagnetic energy from the satellite 14 to the target 10 followed by a second burst similar to the first burst except that the first frequency is changed to a second frequency. In this connection, it should be noted that a third (or more) burst at a third (or more) frequency could be used to reduce the loss due to fluctuation of the amplitude of echo signals and to suppress clutter to further increase target detectability. Preferably the PRF from burst-to-burst will be kept the same during one detection dwell on a target area. This is done to simplify the processing.

The duty cycle of each burst is in the order of 5% to 10%. Thus, even though some degree of range eclipsing may occur during one of the bursts, such eclipsing is not material here. It will be noted, however, that the peak power of each one of the individual pulses must be relatively high in order to attain a reasonable detectable range (say 600 miles or more). This in turn means that the T/R module 18 may be operated class C (as opposed to class A for the pulse train shown in FIG. 2B). As a result, then, a higher power efficiency is attained when the pulse train of FIG. 2A is used so that a lighter and smaller power supply (not shown) may be used.

The pulse repetition frequency of the bursts of pulses is relatively high; in consequence, the lowest blind speed here is higher than the highest velocity of any target (such as target 10, FIG. 1) of interest. It follows, then, that a conventional pulse Doppler receiver may be used to detect any target that is not obscured by clutter.

If it be assumed that clutter is essentially stationary with respect to the terrain (not numbered, FIG. 1), then the apparent Doppler velocity of each bit of clutter within the beam (not numbered, FIG. 1) will be equal to the product of the velocity of the satellite 14 (FIG. 1) and the cosine of the angle between the line-of-sight to each such bit and the effective velocity vector of the satellite. The amplitude of each bit of clutter is directly proportional to the antenna gain of the beam forming antenna 12 (FIG. 1) in the direction of each bit. In a practical case, the antenna gain of only the main lobe and a portion of the first side lobe near the center of such lobe is high enough to allow the amplitude of clutter in the direction of the main lobe and an area near the middle of the first side lobe to be of any significance. In the frequency domain, aliasing occurs so the spectrum of clutter folds around the frequency corresponding to each blind speed; when, as here, the lowest blind speed is higher than the highest velocity of interest, folding is of no consequence.

The width, i.e., time duration, of each pulse is not critical to the invention so long as the width is not so short as to require an excessively high amplitude. Here the width of each pulse may be in the order of ten microseconds, with each pulse being preferably modulated by a nonlinear chirp so that pulse compression may be used to achieve range resolution corresponding to the range resolution achievable with a much shorter pulse.

It will now be seen that the waveform shown in FIG. 2A is well adapted for situations in which the Doppler velocity of the target 10 (FIG. 1) differs substantially from the range of Doppler velocities of clutter.

When the Doppler velocity of the target 10 (FIG. 1) is within range of Doppler velocities of clutter (whether main lobe clutter or side lobe clutter) the echo signal from the target 10 (FIG. 1) is ordinarily masked by the clutter. It is necessary then to utilize some technique selectively to attenuate clutter without a corresponding decrease in the amplitude of the echo signal.

The technique used must also be effective to allow the minimum Doppler velocity (MDV) of any target to be as low as possible. The latter requirement dictates that the conventional DPCA technique here contemplated for processing an echo signal in the presence of clutter be modified. Specifically, the PRF must, in effect, be reduced to reduce processing losses; at the same time, the actual PRF must be kept high to avoid blind speeds and to maintain a desired maximum range for the pulse Doppler radar. The two seemingly antithetical requirements for PRF are here met by modifying the known DPCA technique (as described by E. J. Kelly et al in "A Displaced Phase Center Antenna Concept for Space Based Radar Applications," IEEE EASCON '83- 16th Annual Electronics and Aerospace Conference and Exposition, September 1983) by using a PRF that is high enough to avoid blind speeds for any target of interest and then selectively delaying received signals so that the received signals corresponding to each transmitted pulse are not compared with the received signals from the immediately preceding transmitted pulse (as is usually done), but rather is compared with the received signals corresponding to an earlier transmitted pulse. Here the received signals corresponding to each transmitted pulse are compared with the received signals from the third preceding transmitted pulse. The result then is that, in effect, the PRF for processing is reduced to one-third the actual PRF to reduce DPCA processing losses without reducing the blind speeds and maximum range.

Figure 3:
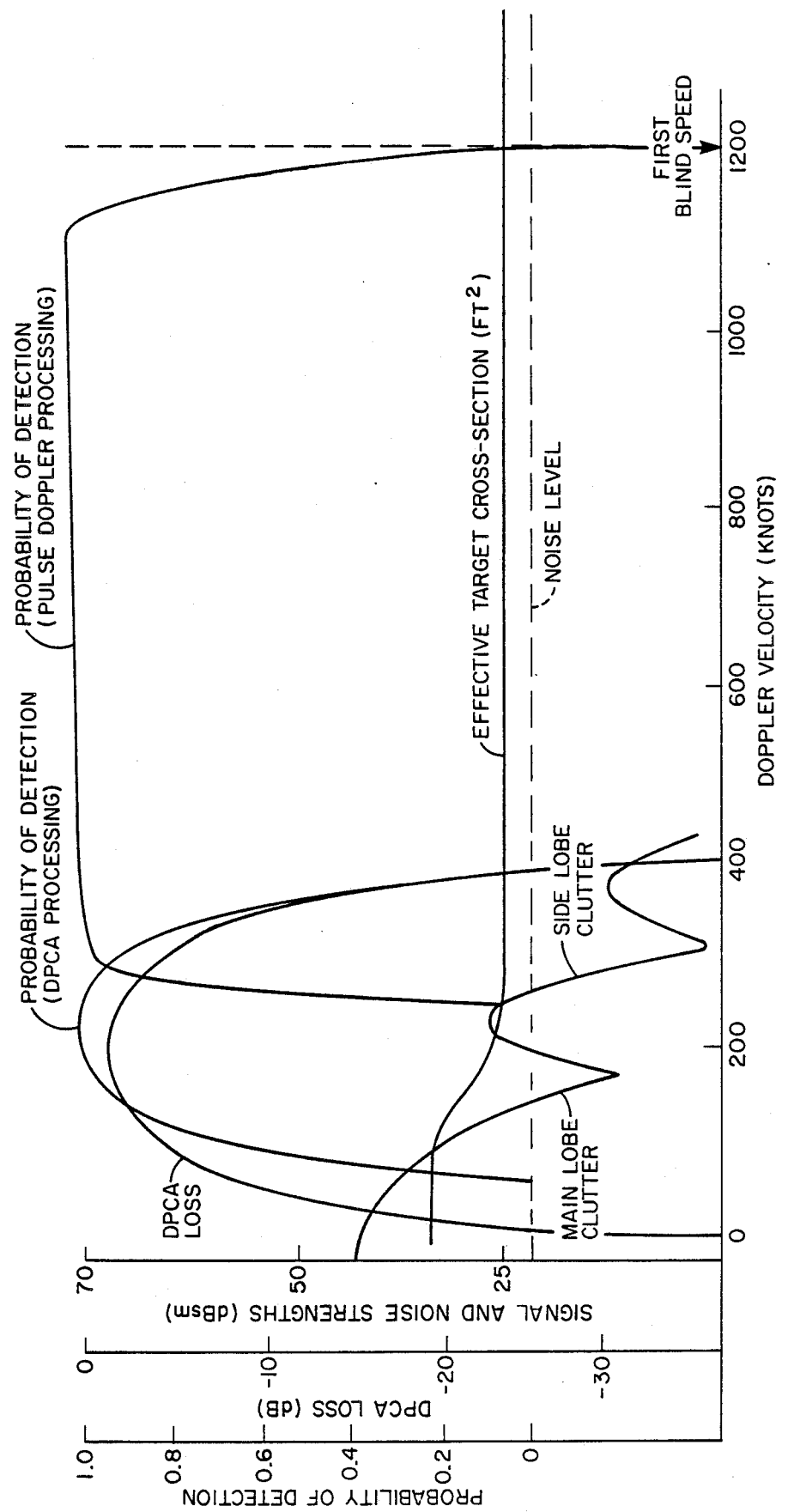
FIG. 3 is a sketch of an exemplary spectrum showing how the various parameters of interest vary with Doppler frequency of a target.

The curves in FIG. 3 show clearly that there is a higher range of Doppler velocities in which processing by any known pulse Doppler technique is to be preferred and that there is a lower range of Doppler velocities in which DPCA processing is to be preferred. Thus, in the higher range of Doppler velocities between about 300 knots and 1200 knots it is almost certain that pulse Doppler processing would result in detection and in the lower range of Doppler velocities between about 100 knots and 300 knots it is almost equally certain that DPCA processing would result in detection. The limits on the lower range are fixed, on the lower side, by the relative amplitudes of main lobe clutter and the echo signal and clutter cancellation achieved (as limited in part by system errors and in part by internal clutter spread), and on the upper side by the DPCA processing loss. In any event, it may be seen from FIG. 3 that the widest range of Doppler velocities in which the Doppler velocity of a detectable target may be is attained by combining the range in which DPCA processing is more efficient with the range in which pulse Doppler processing is more efficient.

It should be noted that the effective cross-sectional area of the target 10 (FIG. 1) varies with aspect angle and range. The variation with aspect angle is reflected in the increase in effective cross-sectional area at lower Doppler velocities. To put it another way, when the target 10 (FIG. 1) is on a crossing course, Doppler velocity is low but the radar cross-section of the target 10 (FIG. 1) is greater than when the target 10 is on a closing course and the Doppler velocity is high. It follows then that, even though the DPCA processing loss is greater with a lower Doppler velocity of a target, the increase in effective cross-sectional area counteracts such loss to a significant degree. Further, it should be noted that the illustrated curve for effective cross-sectional area is exemplary only; such curve would be translated up or down with change in range of the target 10 (FIG. 1).

Figure 4:
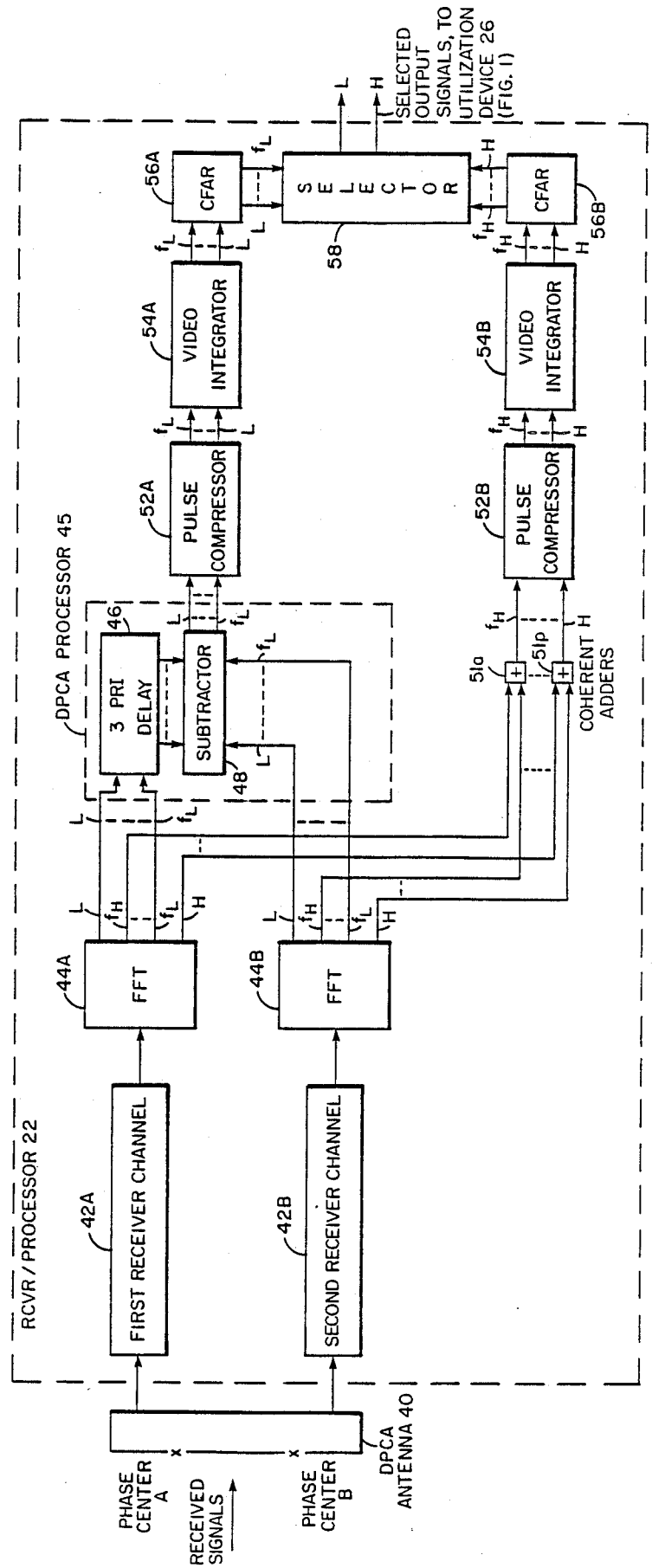
FIG. 4 is a generalized block diagram of apparatus to perform the method contemplated by the invention.

Referring now to FIG. 4, a known receiving arrangement to effect the combination of ranges as just mentioned is shown to consist of the following elements that are needed for understanding the contemplated method: a DPCA antenna 40; a first and a second receiver channel 42A, 42B; a first and a second Fast Fourier Transform (FFT 44A, FFT 44B); a DPCA processor 45 made up of a three pulse repetition interval delay (3 PRI DELAY 46) and a subtractor 48; coherent adders $51a \ldots 51p$; pulse compressors 52A, 52B; video integrators 54A, 54B; constant false alarm circuits 56A, 56B; and a selector 58. As noted previously, the DPCA antenna 40 is preferably a phased array antenna wherein the phase center of such antenna may, during receiving, be changed from phase center A to phase center B to compensate for motion of such antenna. The first receiver channel 42A is fed by received signals from the antenna elements that determine phase center A and the second receiver channel 42B is fed by received signals from the antenna elements that determine phase center B. Each one of the first and second receiver channels 42A, 42B is conventional in construction so that each produces an output in a form fit to feed the corresponding one of FFTs 44A, 44B. In particular, each one of the first and second receiver channels is adapted to reduce the spectrum of clutter to a spectrum wherein main lobe clutter is centered at a Doppler velocity of zero. Each FFT is of conventional construction to act as a comb filter dividing the frequency spectrum of the received signals into N different bands, where N is the number of points in the Fourier Transform performed by FFTs 44A, 44B. Bands between the low end L of FFT 44A and a band $f_L$ are selected for DPCA processing and bands between a band $f_H$ and the high end H of FFT 44B are selected for further processing. The band $f_H$ is lower than the band $f_L$. It will be noted here in passing that each one of the bands between $f_H$ and H in the FFTs 44A, 44B may be deemed, taken together, to be a type of pulse Doppler processor. For this Doppler processing each line from FFT 44A is coherently added to the corresponding line from FFT 44B having the same Doppler frequency. This addition is done to allow the pulse Doppler processing to be done using the whole antenna aperture. This addition is done using coherent adders $51a \ldots 51p$ in FIG. 4.

The 3 PRI delay 46 in the DPCA processor 45 is effective to correlate clutter signals received at different times, here specifically during times separated by three pulse repetition intervals. When signals from corresponding bands in the FFT 44A (via the 3 PRI delay 46) and the FFT 44B are applied to the subtractor 48, the amplitude of clutter is reduced. It will be observed that the elements making up the DPCA processor 45 may take any of many different known forms. As shown, each element (i.e., the 3 PRI delay 46 and the subtractor 48) is adapted to operate on parallel inputs.

The signals out of the DPCA processor 45 and the FFTs are passed as shown and noted below to a selector 58 of conventional construction. The selector 58 is a logic matrix adapted to determine which, if any, of the input lines carries a signal indicative of a target. For lines having frequencies above $f_L$ or below $f_H$ the logic is trivial because there is only one line having a particular frequency so any such line that is indicated to have a signal is passed on by the logic matrix as having a signal. For the lines between $f_H$ and $f_L$ there are two lines having a particular frequency, say $f_i$, one from the DPCA processor 45 and one from the pulse Doppler channel coherent adders $51a \ldots 51p$. For these lines the logic is as follows: a signal is declared to be present on frequency line $f_i$ between $f_H$ and $f_L$ if a signal is present on either or both of the $f_i$ lines from the DPCA processor 45 and the corresponding pulse Doppler channel coherent adders $51a \ldots 51p$. If the signal is detected on only one of the two $f_i$ lines, the signal from the line on which it is detected is passed on to the output of the selector 58. If the signal is detected on both of the lines $f_i$ the signal with the larger output of the two $f_i$ lines is passed on to the selector 58. The signal may, of course, be simultaneously detected on more than one frequency line between L and H in which case more than one signal detection is passed on by the selector 58.

The signals out of the subtractor 48 and the bands between $f_H$ and H out of the coherent adders 51a ... 51p are first passed through pulse compressors 52A, 52B, then they are video integrated in the integrators 54A, 54B, next they are passed through CFAR circuits 56A, 56B to prevent residual clutter or other interference from causing excessive false detections to be passed onto the selector 58. The coherent adders 51a ... 51p, pulse compressors 52A, 52B, video integrators 54A, 54B and CFARs 56A, 56B are of conventional construction.

There may be some occasion in which the waveform shown in FIG. 2B may be desirable in performing the contemplated method. The waveform shown in FIG. 2B has a high duty cycle of up to 100%, and a burst length corresponding to slightly more than the round trip propagation time from the satellite 14 (FIG. 1) to the target 10 (FIG. 1). Preferably the frequency of each burst is changed until a predetermined number of bursts has been transmitted. Each individual pulse preferably is modulated with a nonlinear chirp. It will be observed that range eclipsing is completely eliminated and that the received signals may be processed as described hereinbefore to enhance subclutter visibility.

The waveform of FIG. 2B typically has poorer detection sensitivity (by 1 to 3 dB) than that of FIG. 2B. This is because of the need to gate out the leading and trailing edges of the echo burst waveform in order to realize good clutter rejection. This gating eliminates the main beam leading and trailing edge clutter and results in the signal echo "window loss." The waveform of FIG. 2B also has poorer subclutter clutter visibility generally than that of FIG. 2A. The clutter rejection obtained with the waveform of FIG. 2B can be improved by using coherent integration of a number, R, of successive bursts. This involves having R successive bursts having the same frequency, the carrier frequency being changed after every group of R bursts are transmitted. The coherent burst-to-burst integration could be done as part of the FFT pulse Doppler processing in FIG. 4. The Doppler filter outputs of these coherently processed bursts are then processed as done when no burst-to-burst coherent integration is used as shown in FIG. 4. The coherent integration dwell time for the waveform of FIG. 2B would have to be about two times that of FIG. 2A to achieve the same subclutter visibility. The waveform of FIG. 2B would be used for a high altitude satellite where the round trip time is large and hence the coherent integration time is large so that the window loss is small and preferably no burst-to-burst coherent integration need be used and where an antenna concept is being used that prefers a lower peak power per module.

Generally, the range ambiguity typically resulting from the use of the high PRF waveforms of FIGS. 2A and 2B is eliminated on a later detection verification or track initiation transmission which uses a burst similar to that of FIG. 2A or FIG. 2B with a different PRF. This second PRF would be chosen using standard logic to ensure that no Doppler blind speeds occur for the detected targets and to ensure that the ranges of the detected targets can be determined.

Having described a preferred embodiment of this invention, it will now be apparent to one of skill in the art that other embodiments incorporating its concept may be used. Therefore, it is believed that this invention should not be restricted to the disclosed embodiment, but rather should be limited only by the spirit and scope of the appended claims.

What is claimed is:

1. The method of operating a pulse Doppler radar in a satellite moving in orbit around the earth to increase the probability of detection of an airborne target moving relative to the earth so that the Doppler velocity of such target as observed by such radar falls within a predetermined range of velocities centered on zero, such radar also incorporating a Displaced Phase Center Antenna feeding at least a first and a second receiving channel to provide signals for cancelling clutter, such method comprising the steps of:

(a) transmitting a burst of interrogating pulses characterized by a first carrier frequency, a duty cycle less than about 10%, a pulse repetition frequency higher than the lowest pulse repetition frequency that results in a blind speed within the predetermined range of velocities and a duration preferably much greater than the round trip propagation time of pulses between the pulse Doppler radar and the airborne target;

(b) separately processing received signals in the first and the second receiving channel to derive a first and a second spectrum of the Doppler shift frequencies of such received signals, each such spectrum having lower bands of frequencies indicative of clutter and echo signals from any airborne target having a like lower Doppler shift frequency and higher bands of frequencies indicative of echo signals from any airborne target having a like higher Doppler shift frequency;

(c) delaying each signal in the lower band of frequencies out of the first receiving channel by a length of time equal to N times the interval between successive pulses in the burst of interrogating pulses, where N is an integer greater than or equal to 1;

(d) subtracting each delayed signal from the corresponding signal in the then extant lower band of frequencies out of the second receiving channel to cancel clutter, thereby forming a first resultant band wherein any signal is representative of an airborne target;

(e) coherently combining the higher bands of frequencies out of the first and the second receiving channel thereby forming a second resultant band wherein any signal is representative of an airborne target; and (f) selecting from the first and the second resultant band, the signal of greater magnitude.

2. The method as in claim 1 comprising, in addition, the steps of coding each interrogating pulse and passing the received signals through a matched filter.

3. The method as in claim 1 with a changed carrier frequency of interrogating pulses.

4. The method of operating a pulse Doppler radar in a satellite moving in orbit around the earth to increase the probability of detection of an airborne target moving relative to the earth so that the Doppler velocity of such target as observed by such radar falls within a predetermined range of velocities centered on zero, such radar also incorporating a Displaced Phase Center Antenna feeding at least a first and a second receiving channel to provide signals for cancelling clutter, such method comprising the steps of:

(a) transmitting a burst of interrogating pulses characterized by a first carrier frequency, a high duty cycle of up to 100%, a pulse repetition frequency higher than the lowest pulse repetition frequency that results in a blind speed within the predetermined range of velocities and a duration preferably slightly exceeding the round trip propagation time of pulses between the pulse Doppler radar and the airborne target;

(b) separately processing received signals in the first and the second receiving channel to derive a first and a second spectrum of the Doppler shift frequencies of such received signals, each such spectrum having lower bands of frequencies indicative of clutter and echo signals from any airborne target having a like lower Doppler shift frequency and higher bands of frequencies indicative of echo signals from any airborne target having a like higher Doppler shift frequency;

(c) delaying each signal in the lower band of frequencies out of the first receiving channel by a length of time equal to N times the interval between successive pulses in the burst of interrogating pulses, where N is an integer greater than or equal to 1;

(d) subtracting each delayed signal from the corresponding signal in the then extant lower band of frequencies out of the second receiving channel to cancel clutter thereby forming a first resultant band wherein any signal is representative of an airborne target;

(e) coherently combining the higher bands of frequencies out of the first and the second receiving channels thereby forming a second resultant band wherein any signal is representative of an airborne target; and (f) selecting from the first and the second resultant bands, the signal of greater magnitude.

5. The method as in claim 4 comprising, in addition, the steps of coding each interrogating pulse and passing the received signals through a matched filter.

6. The method as in claim 4 with a changed carrier frequency of the interrogating pulses.

* * * * *